(12) United States Patent
Ambusk

(10) Patent No.: US 9,007,256 B1
(45) Date of Patent: Apr. 14, 2015

(54) TREES-TREE ROOT EXAMINATION, EVALUATION AND STANDARDIZATION

(76) Inventor: Marie V. Ambusk, So Burlington, VT (US)

( * ) Notice: Subject to any disclaimer, the term of this patent is extended or adjusted under 35 U.S.C. 154(b) by 514 days.

(21) Appl. No.: 13/317,425

(22) Filed: Oct. 18, 2011

Related U.S. Application Data

(60) Provisional application No. 61/455,352, filed on Oct. 19, 2010.

(51) Int. Cl.
*G01S 13/88* (2006.01)
*G01V 3/12* (2006.01)

(52) U.S. Cl.
CPC ............... *G01S 13/885* (2013.01); *G01V 3/12* (2013.01)

(58) Field of Classification Search
CPC ....... G01S 13/89; G01S 13/88; G01S 13/885; G01V 11/00; G01V 3/12
USPC ......................................... 342/22, 27, 179, 58
See application file for complete search history.

(56) References Cited

U.S. PATENT DOCUMENTS

| | | | | |
|---|---|---|---|---|
| 5,647,439 A * | 7/1997 | Burdick et al. | ................. | 172/4.5 |
| 6,082,466 A * | 7/2000 | Gudat | ............................... | 172/5 |
| 6,246,355 B1 * | 6/2001 | Miceli et al. | .................... | 342/22 |
| 6,347,551 B1 * | 2/2002 | Turpening et al. | ............... | 73/628 |
| 6,496,136 B1 * | 12/2002 | Mucciardi | ........................ | 342/22 |
| 6,522,284 B2 * | 2/2003 | Miceli et al. | ..................... | 342/22 |
| 6,690,316 B2 * | 2/2004 | Yankielun | ....................... | 342/22 |
| 6,999,021 B2 * | 2/2006 | Taylor et al. | .................... | 342/22 |
| 7,612,704 B2 * | 11/2009 | Ryerson et al. | .................. | 342/22 |
| 7,987,735 B2 * | 8/2011 | Mann et al. | ................ | 73/862.59 |
| 8,275,547 B2 * | 9/2012 | Rousselle et al. | ................. | 702/2 |
| 2004/0150555 A1 * | 8/2004 | Walton | ......................... | 342/195 |
| 2008/0042653 A1 * | 2/2008 | Bryant | .......................... | 324/348 |
| 2008/0246647 A1 * | 10/2008 | Hellsten | .......................... | 342/22 |
| 2009/0210205 A1 * | 8/2009 | Sullivan et al. | .................... | 703/6 |
| 2010/0205219 A1 * | 8/2010 | Rousselle et al. | ............. | 707/797 |
| 2012/0096823 A1 * | 4/2012 | Moore | .......................... | 56/10.1 |
| 2012/0169498 A1 * | 7/2012 | Leppanen et al. | ............ | 340/540 |
| 2012/0190977 A1 * | 7/2012 | Persson et al. | ................. | 600/430 |
| 2013/0050008 A1 * | 2/2013 | Atkins et al. | ..................... | 342/22 |
| 2013/0211721 A1 * | 8/2013 | Parisa | ............................... | 702/2 |

* cited by examiner

*Primary Examiner* — John B Sotomayor
(74) *Attorney, Agent, or Firm* — Burns & Levinson LLP

(57) ABSTRACT

This invention will be an apparatus, system and use of Ground Penetrating Radar (GPR) as a noninvasive and non-destructive means to detect and examine tree roots, below grade of the soil surface. This invention will provide a means and methodology for objective evaluation of tree root defects based upon standards for urban trees at all levels of the Nursery Tree Industry. The output from software algorithms will provide guidance for remediation of defects when appropriate, inventory and management data for proactive maintenance at all levels of the supply chain. This apparatus, system and methodology will be a new and useful process at all levels of the supply chain for nursery tree stock.

10 Claims, 3 Drawing Sheets

TREES-TREE ROOT EXAMINATION, EVALUATION AND STANDARDIZATION

CROSS REFERENCE TO RELATED APPLICATION

This application claims priority to and benefit of U.S. Provisional Patent Application No. 61/455,352 filed on Oct. 19, 2010.

TECHNICAL FIELD

The tree root examination, evaluation and standardization system is a ground penetrating radar (GPR) apparatus, system and methodology of use for inspection and objective evaluation of tree root structure below ground with guidance to remediate defective roots.

BACKGROUND

Each year, millions of trees are planted in our urban landscape; along city streets, in parks and in our back yards. Our hope is that they will grow, improve the value of our property with their beauty, help to cool hardscapes with the shade of their full canopies, provide habitat, block cold and wind and filter Green House Gases from the atmosphere in a way that only trees can do. Sadly, most of the trees we plant in our communities may never reach their full potential. These smaller and shorter-lived trees have more difficulty coping with urban soils, succumb to more stress related disease and invasive pest problems. Smaller and shorter-lived trees offer fewer aesthetic and environmental benefits at an untold cost to our planet and us.

Trees grown in mass production for the purpose of resale are generally grown in a field or in a container of some type. There is great potential for nursery stock trees to develop defective roots, yet remediation of the defects is seldom done because there is little visibility of the root system inside the root ball or below ground when planted in the landscape.

While growing in the nursery location, trees are often planted too deep in the ground or in some type of container; thus the tree stem is below grade of the soil surface. This practice helps to keep the trees from falling over with little or no staking needed. The field grown trees are often harvested by using a spade machine that cuts a root ball from the soil and it is then placed into a 'bag & burlap' wrap and/or a container of some type. Wire baskets are often used for larger root balls to help in storage of and/or transporting the trees.

When planted in the landscape, healthy tree root systems grow shallow (mostly within 18 to 20 inches below grade) with a spreading habit that extends a great distance from the stem of the tree. It is important to retain a sufficient amount of good quality roots for them to grow into healthy trees with a stable structure to promote the long-term benefits that only trees can provide.

With my invention, tree root examination, evaluation and standardization system, an apparatus using ground penetrating radar (GPR) technology applied to a new method of use will offer meaningful and useful information to evaluate and remediate root defects.

The following four examples represent some of the problems with tree roots that occur out of sight, below grade of the soil surface, however these examples are without limitation. The trees' long-term health, sustainability, value, and opportunity to provide aesthetic and most importantly, ecologic benefits are greatly diminished; unless the problems are detected and corrected. (For these examples the consumer is comprised of, but not limited to, wholesale suppliers, retail suppliers, developers, landscapers, arborists, municipalities, foresters, homeowners, ecosystems, the environment.)

Problem 1 currently occurs during harvest of field grown trees using a tree spade. When a nursery tree is planted too deep, the tree spade can cut as much as 80% to 90% of the critical roots off the tree at the time of harvest. The tree is then placed in a wire basket with bag & burlap or a container of some type for storage and/or transportation.

The consumer is unable to objectively evaluate the complexity of the root structure in soil to determine root defects and/or judge the current and long-term value of the investment.

Problem 2 currently occurs when harvested trees (as noted in Problem 1) remain in wire basket with bag & burlap or a container of some type for excessive periods of time. In this case, the tree roots could begin to grow in a circular fashion in the confined space. Also, a secondary root system can begin to grow from the stem below grade of the soil level also in a circling pattern. The longer the tree remains in a container, the more likely the root structure will be compromised.

The consumer is unable to objectively evaluate the complexity of the root structure in soil to determine root defects and/or judge the current and long-term value of the investment.

Problem 3 currently occurs when a tree has been grown in a container. The process generally requires transplanting the tree multiple times as it outgrows each smaller container. (For example, from a 2" container, to 4", to 6" to 10" and so on.) The trees roots tend to grow in a circular pattern with containerized plants (as noted in Problem 2) and this becomes very serious to the tree with stem circling roots in a number of layers through the container's root ball. "Stem girdling roots" is a root collar disorder where the roots grow tightly around the tree stem. The conflict eventually results in extreme compression of the woody and nonwoody tissue of the stem, interfering with the hydraulic process to transport water and food to the crown from the roots and carbohydrates from the crown to be stored in the roots. If the disorder of stem girdling roots goes uncorrected, it could cause decline of health, loss of productivity and early death of the tree.

The consumer is unable to objectively evaluate the complexity of the root structure in soil to determine root defects and/or judge the current and long-term value of the investment.

Problem 4 currently occurs when a tree has been planted in the urban landscape and is experiencing distress due to the critical root structure that has been compromised. This could be due to many things including but not limited to: failure to remove wire basket, bag & burlap fabric, planting too deep, condition of stem girdling roots or any number of conditions resulting in a root collar disorder.

The planted trees, present a challenge to the consumer in an attempt to perform best maintenance practices in caring for the trees in order to maximize the tree benefits.

The Morton Arboreturn-Urban Tree Roots Systems http://www.mortonarb.org/urban-tree-root-systems.html:

"It is estimated that over 80% of all landscape problems originate below ground, but even basic knowledge about urban soils and root management is lacking."

The consumer is unable to objectively evaluate the complexity of the root structure in soil to determine root defects and/or judge the current and long-term value of the investment.

Often, by the time the tree has signs of decline due to root disorder, it has been too severely compromised to warrant the effort and expense required to correct the problem. This is a list, but without limitation, of some economic and environmental impacts when the trees we plant die long before their time: cost to replace trees, repair property damaged by tree failure, liability for property damage and person injury, property value, impact on the environment for opportunity loss of Green House Gases avoidance and sequestration, cooling from shade, ecosystem watershed filtration, noise reduction and the ability to support wildlife habitat will be at risk with less healthy, less sustainable trees in the urban landscape.

BRIEF SUMMARY OF THE INVENTION

This invention is a ground penetrating radar (GPR) apparatus, system and methodology of use for inspection and objective evaluation of tree root structure below ground with guidance to remediate defective roots.

Ground penetrating radar (GPR) is a non-invasive and non-destructive technological means to detect objects, such as tree roots, below grade of the soil surface. Application of this invention will be focused on, for example but without limitation, the critical root structure zone of the nursery stock trees for resale as well as trees planted in the urban landscape. The apparatus will be used to scan the roots from the top down for trees planted in the landscape or in any direction for a tree growing in a container of any type. Based on industry standards and best maintenance practices, software will be developed using algorithms to interpret the GPR data, evaluate, quantify and document key elements of the objective evidence and offer guidance to remediate the problems.

Information will be available from the earliest stages of growing trees for resale through the sale to the ultimate consumer and beyond as an ongoing inventory and maintenance tool. With this invention, there will be visibility to the problems noted above and recommendations to remediate the problems. This will offer answers and, according to standards, to these questions but is not limited to this scope:

Problem #1—were sufficient roots harvested with the field grown tree?

Problem #2—is there evidence of defective roots in the root ball of the field grown tree that was harvested some time ago?

Problem #3—is there evidence of defective roots in the root ball of the container-grown tree?

Problem #4—what is the condition of the tree roots after planting in the landscape?

This invention will do for the nursery tree industry what food labels have done for the food industry by offering visibility to an otherwise invisible set of critical variables. Outcome of the objective evidence data, based on industry standards will greatly improve the consumers' tool-kit for ongoing 'best maintenance practices' by solving a problem at the "root of it!"

DETAILED DESCRIPTION OF THE INVENTION

Figure 1:
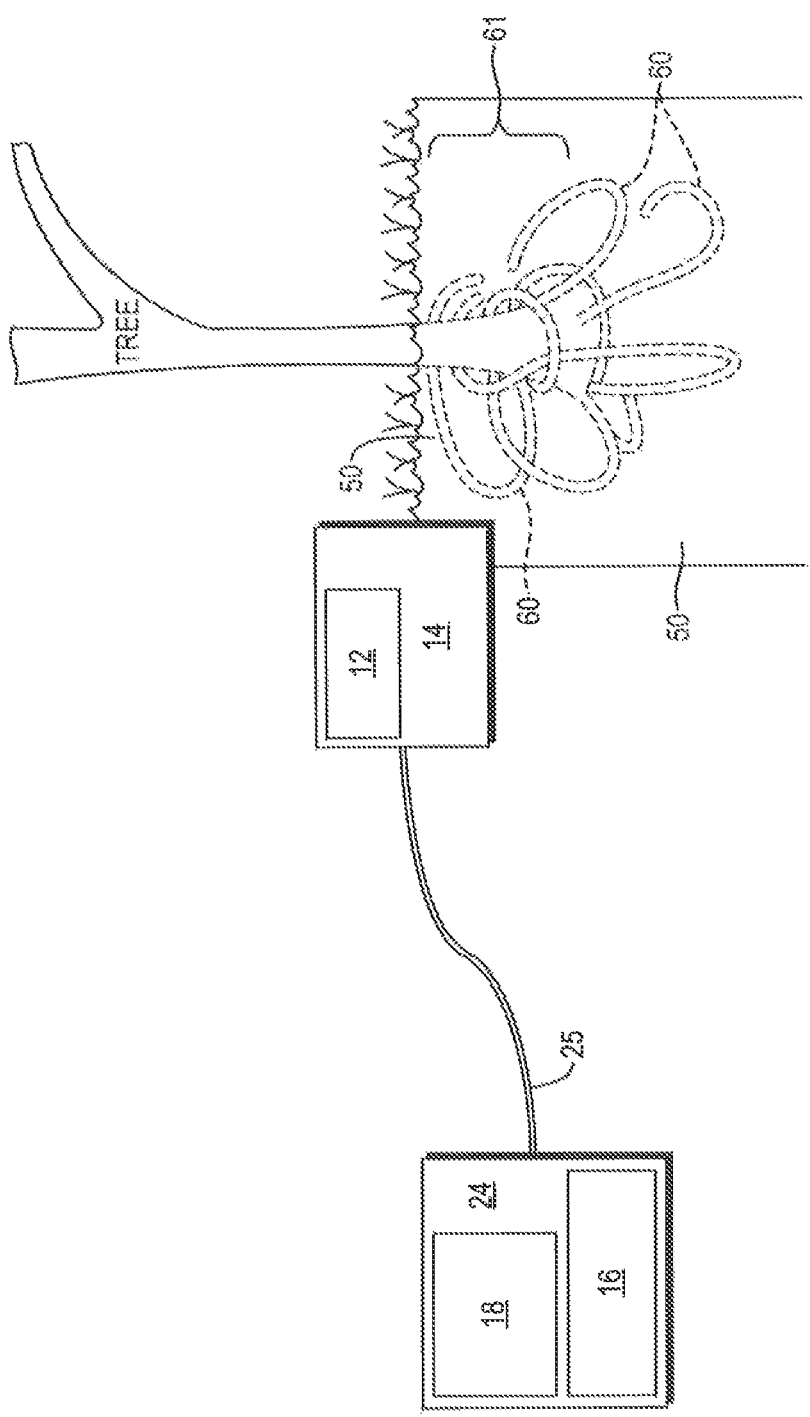
FIG. 1 illustrates the application of a ground penetrating radar tree root apparatus according to an exemplary method of the invention applied to tree roots planted in soil, in the landscape, or soil in a container.

In one aspect, referring to FIG. 1, this invention, will be a ground penetrating radar (GPR) tree root apparatus 10 to detect, quantify and classify root complexities 60 of trees. This invention will also be a method to objectively evaluate the condition of tree roots 60 through analysis based upon industry standards.

This invention is relevant, but not limited to the tree nursery industry and urban forestry industry, also referred to as the green industry. Application of this invention will be relevant throughout all aspects of the tree nursery industry supply chain cycle. (for example: wholesale and retail supplier, homeowners, developers, landscapers, arborists, municipalities, foresters, ecosystems, environment)

With continued reference to FIG. 1, in one embodiment, the apparatus 10, according to the invention, will be used for examination or inspection of tree root 60 complexity prior to and/or following harvest of field grown stock at the suppliers' site and for trees grown and/or transported in containers of any kind.

In one embodiment, the apparatus 10, according to the invention, will provide objective evidence upon examination of the roots 60 below grade of the soil 50. Output of the apparatus 10 will provide, but is not limited to data such as: detection of defined root defects; location of root defects; depth of tree stem 61 below grade of the soil; recommendations to remediate identified defects; GPS location data; bar-coded label of data output; inventory management data; individual tree history tracker.

The method for data attributes will be comprised of but not limited to, requirements considered to be standard or best practices for the urban tree industry. Among the attributes will be to derive or detect: depth of the tree stem below grade of the soil level; depth of tree root collar; evidence of root defect (stem circling or girdling roots, diving or ascending roots, etc.); volume of root mass to container; GPS location calculation; detection of wire basket planted with tree; ability to provide critical data evaluation on bar-coded label or other such tree data sheet; storage of tree type; option to capture visible aspects of tree from ground up; diameter at breast height (DBH); date stamp.

Figure 2:
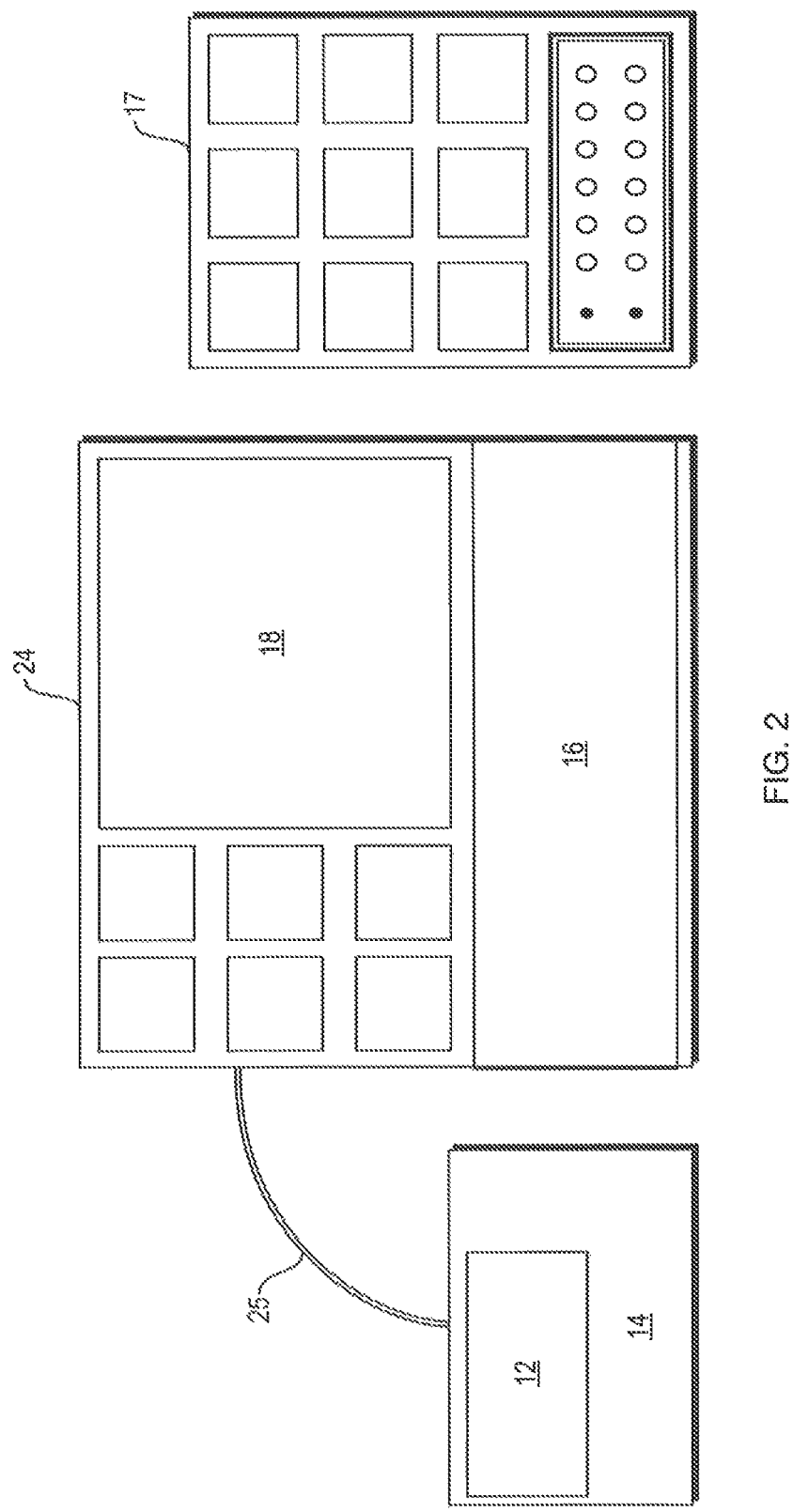
FIG. 2 diagrammatically illustrates an exemplification of the ground penetrating radar tree root apparatus according to one embodiment of the invention.
Figure 3:
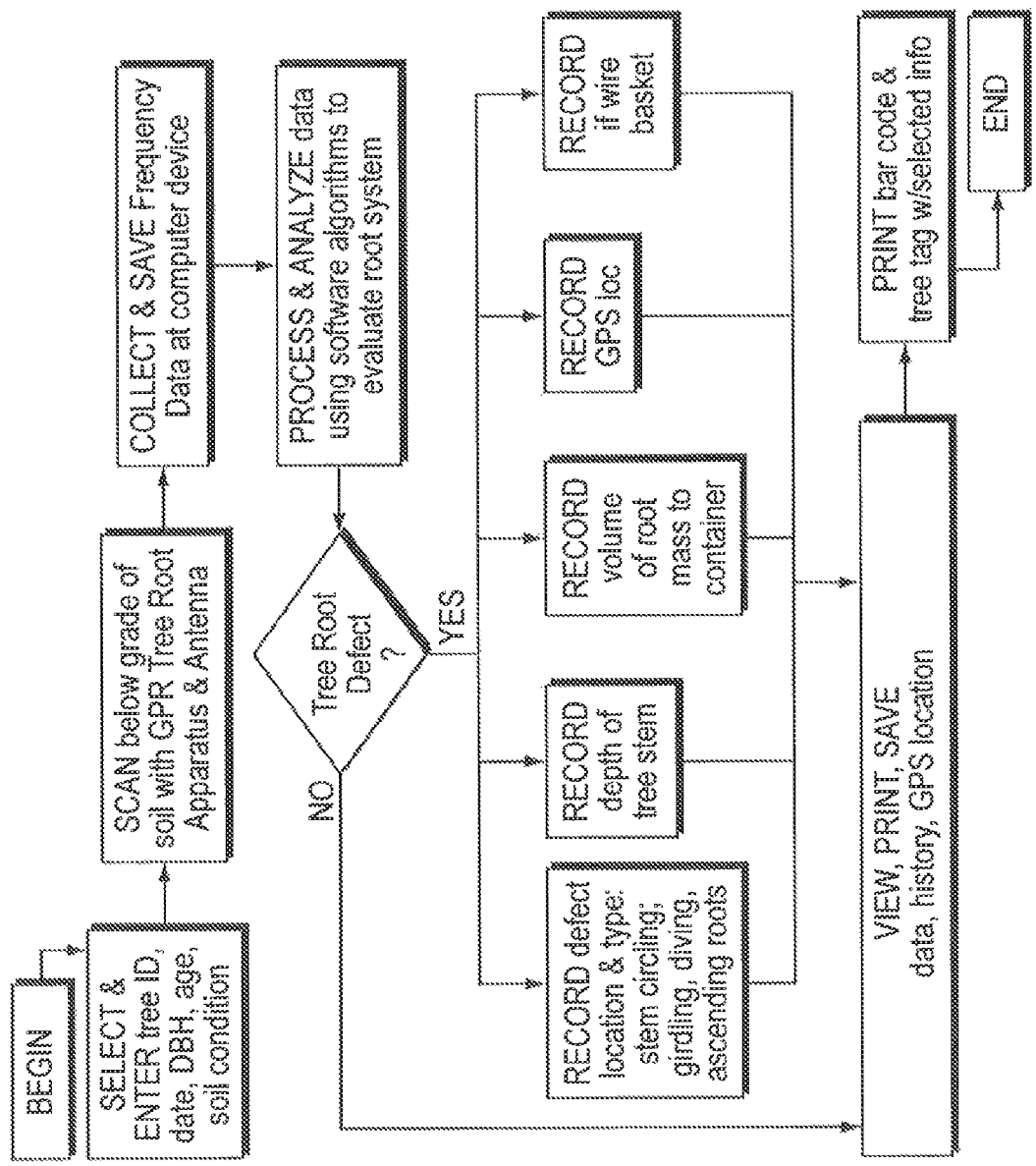
FIG. 3 illustrates an exemplification of the method of applying the ground penetrating radar tree root apparatus illustrated in FIG. 1 and the method illustrated in FIG. 2 according to one embodiment of the invention.

Referring to FIGS. 1 and 2, the apparatus 10 for detecting a tree's roots 60 below grade of the soil 50 will include ground penetrating radar frequency using an antenna 12 of from 200 Mhz to 2600 Mhz, but not limited by that range. Soil 50 condition will be one of the variable requirements to assure consistency in objective evidence output. The radar frequency data 18 will be transmitted to a computer storage device 24 with analytical software programs 16 to interpret according to standards.

With continued reference to FIGS. 1 and 2, in one embodiment, the apparatus 10, according to the invention, will detect a tree's roots 60 below grade of the soil 50 by use of ground penetrating radar frequency using an antenna 12 of from 200 Mhz to 2600 Mhz, but not limited by that range. Soil 50 condition will be one of the variable requirements to assure consistency in objective evidence output. The radar frequency data 18 will be transmitted to a computer device 24 with analytical software programs 16 to interpret according to standards. The output of the data will provide users with useful information to remediate defective roots when identified.

The apparatus 10 will include, but is not limited to, a radar antenna 12, computer storage device 24, software algorithm 16 to analyze gathered data. The devices will be designed to accommodate current technology including, but not limited to, wireless devices, barcoding scan and readers, OPS location technology and any other 'smart' data devices 17.

The apparatus 10 for detecting the tree's roots 60 below grade of the soil 50 will be designed to accommodate technology advancements ongoing. For example, the apparatus 10 could be a scanning tool 14 attached to a computer storage device 24 by use of a cable 25 or it could be a self contained, wireless hand held device without a cable or it could be configured as an application to be used with a "smart phone" type of device 17 and not limited to today's technology for portability, ease of use and functionality and optional power sources.

This invention will do for the nursery tree industry what food labels have done for the food industry by offering visibility to an otherwise invisible set of critical variables. Outcome of the objective evidence data based on industry standards will greatly improve the consumers' tool-kit for ongoing 'best maintenance practices' by solving a problem at the "root of it!"

The invention claimed is:

1. A method for detecting defects of tree roots below grade of the soil, comprising:
   providing an apparatus comprising an antenna and adapted to generate radar frequency data representing the configuration of said tree roots below grade of the soil;
   applying said apparatus above soil grade in the region of said tree roots;
   generating said radar frequency data;
   providing a computer storage device for storing said radar frequency data;
   providing an algorithm configured to correlate said generated radar frequency data with defects below grade in said tree roots;
   processing said radar frequency data by said computer storage device and said algorithm whereby said generated radar frequency data is correlated with defects below grade in said tree roots.

2. The method of claim 1 wherein said antenna comprises a frequency range of 200 mHz to 2600 mHz.

3. The method of claim 1 wherein said tree root defects are selected from the group consisting of stem circling roots, stem girdling roots, diving roots, and ascending roots.

4. The method of claim 1 wherein said radar frequency data comprises data selected from the group consisting of the depth of the tree stem below soil, the depth of the tree root collar, the volume of root mass, and the detection of a wire basket.

5. The method of claim 1 further comprising, wirelessly transmitting said radar frequency data to said computer storage device.

6. The method of claim 1 wherein applying said radar device above soil grade in the region of said tree roots comprises scanning said tree roots from the top down.

7. The method of claim 1 wherein applying said radar device above said soil grade in the region of said tree roots comprises scanning said tree roots from any direction.

8. A method for assessing the health of a tree, comprising:
   providing a radar system capable of transmitting radar waves below soil grade and receiving return reflections of the transmitted radar waves;
   transmitting radar waves from the radar system towards the roots of a tree below soil grade;
   receiving return reflections of the transmitted radar waves;
   storing in a memory data representing the received reflections of the transmitted radar waves; and
   processing the stored data representing the received reflections of the transmitted radio waves with at least one algorithm that correlates the stored data with selected identifiable characteristics of tree roots.

9. The method of claim 8 wherein tree roots below grade of soil comprises tree roots in a container.

10. The method of claim 8 wherein identifiable tree roots are selected from the group consisting of stem circling roots, stem girdling roots, diving roots, and ascending roots.

* * * * *